Patented May 23, 1944

2,349,508

UNITED STATES PATENT OFFICE 2,349,508

ADHESIVE COMPOSITION OF MATTER

Gerry Mack, Jackson Heights, N. Y., assignor to Advance Solvents and Chemical Corporation, a corporation of New York No Drawing. Application November 28, 1941, Serial No. 420,811

10 Claims. (Cl. 260—23)

My invention relates to compositions of matter having adhesive qualities, and more particularly to pressure sensitive adhesives.

Pressure sensitive adhesives have been known heretofore, but in a number of instances these compositions have suffered from the disadvantage of being fairly unstable, particularly when exposed to the action of air. Accordingly, it is one of the objects of this invention to provide a pressure sensitive adhesive composition which will have superior stability and which will retain its adhesive properties when exposed to air.

Also, amongst heretofore known pressure sensitive adhesive compositions, a number suffered from the disadvantage that they were not transparent, a property which is highly desirable. Accordingly, it is another of the objects of this invention to provide a pressure sensitive composition that will be transparent and clear when it is associated with sheets or films of "Cellophane" (regenerated cellulose), cellulose acetate, ethyl cellulose, cellulose nitrate, "Pliofilm" (rubber hydrochloride), and similar clear flexible sheet like materials. The adhesive, of course, can also be applied to fibrous materials such as paper and latex treated paper.

Amongst the drawbacks of some previously known pressure sensitive adhesive compositions has been the characteristic property that the adhesive was offsetting, that is to say, that the adhesive sheet or film when removed from surfaces to which it was supposedly temporarily applied would leave the adhesive on the surface to which it had previously adhered. Accordingly, it is another of the objects of my invention to provide a non-offsetting adhesive, so that the pressure sensitive adhesive sheet or film may be removed from surfaces to which it is temporarily applied without leaving the adhesive on the surface.

Another of the objects of my invention is to provide an adhesive composition which will adhere under the force of pressure to any desired dry and clear surface, such as metal, glass, wood, lacquered or painted surfaces and the like.

It will be appreciated that such a pressure sensitive adhesive composition also may be used for making masking tape, tabs, display cards, and similar articles, which can be attached to any desired surface by pressing them onto such surface, and to which they will adhere for a reasonable length of time, even when exposed to the action of strong light, such as direct sunlight.

In general, the essential ingredients of the adhesive composition are a rubber like polymer of isobutylene having a molecular weight higher than 30,000 and in the preferred embodiment within the range from about 90,000 to 200,000, a lower molecular weight polymer of isobutylene having a molecular weight higher than 1,000 and in the preferred embodiment within the range between 1,000 to 7,000, a non-volatile plasticizer such as methyl abietate or hydrogenated methyl abietate, a resin from the class of rosin ester gums, coumarone indene polymers, hydrogenated coumarone indene resins, terpene polymers, or from the family of natural resins, such as dammar and preferably dewaxed dammar resin, and a selected fatty mono-ester which acts as a stabilizer for the adhesive composition.

The rubber like polymers of isobutylene can be prepared readily by polymerizing isobutylene at low temperatures in the presence of a volatilizable inorganic halide as a catalyst. The temperature may be within the range of 5° C. and —80° C., depending upon the particular catalyst used and the type of polymer desired.

A low polymer of isobutylene can be prepared by polymerizing at a temperature of about —10° C. by bubbling boron fluoride gas through a solution of isobutylene dissolved in propane. A polymer within the range of between 4,000 to 6,000 molecular weight may be prepared in this manner and the volatile solvent may be removed by distillation, after which the polymer can be washed with water or dilute caustic soda to remove any residual catalyst.

A polymer having a much higher molecular weight, that is above 30,000, and within the range of 90,000 to 200,000, if desired, can be made by polymerizing isobutylene in the presence of boron fluoride at lower temperatures, such as a —50° C. or even a —100° C., using a substantially pure isobutylene as starting material and a substantially pure boron fluoride as a catalyst, and preferably carrying out the polymerization in the presence of a suitable solvent for the isobutylene, such as purified ethylene or other low boiling liquefied hydrocarbons.

It will be appreciated that the method of preparing the isobutylene polymers per se is given for the purposes of exemplification, and does not of itself comprise a part of the invention. The prior art has disclosed the preparation of these polymers and reference may be had, for instance, to United States Patents Nos. 2,138,895 and 2,203,873 as indicative.

The non-volatile plasticizers that may be used in the preparation of the adhesive composition according to this invention should be compatible with all of the other ingredients present, and I found that the following substances can be used advantageously, although it will be understood that I am not limited to the use of these particular materials:

Methyl abietate, di hydro methyl abietate,
Di ethylene glycol diabietate, chlorinated di phenyl (liquid type), rosin oil, abietyl alcohol,
Poly vinyl methyl ether, poly vinyl ethyl ether,
Poly vinyl isobutyl ether, liquid polymers of beta pinene,
Pine oil, mineral oil.

The stabilizer which, according to my invention, is added to the pressure sensitive composition, is a liquid fatty mono-ester formed by the reaction of a fat acid with a monohydric aliphatic compound selected from the group consisting of the normal primary alcohols and their glycol monoethers. These fatty esters have been found to have a particularly good stabilizing influence on the adhesive composition, especially regarding to its stability under the action of sun and air. The fatty acid esters of the mono-alkyl ethers of ethylene glycol have been found to give superior results, although it will be appreciated that I am not limited to the use of these particular esters. The following compounds are illustrative of the class of fatty esters which have been found to give satisfactory results:

Butyl stearate
Mono-methyl ether of ethylene glycol ricinoleate
Mono-methyl ether of ethylene glycol palmitate
Mono-butyl ether of ethylene glycol stearate
Mono-ethyl ether of ethylene glycol ricinoleate
Mono-ethyl ether of ethylene glycol oleate
Mono-amyl ether of ethylene glycol stearate.

The function of the resin in the composition is to give adhesion as well as to control softness and tackiness. The resins must have the property of being compatible with isobutylene polymers in all proportions, or in such proportions that will provide an adhesive which, when applied in thin films, will be substantially perfectly transparent. The following resins are indicative of those which have been used and which have these properties:

Rosin; hydrogenated rosin; ester gum;
Hydrogenated coumarone-indene resins;
Cycloparaffin resins; terpene diene polymer resins;
Dammar resin; chlorinated diphenyl resins;
Poly vinyl hydroabietanol resin.

It will be understood that by varying the proportions of the ingredients used it is possible to produce a pressure sensitive adhesive composition having adhesive properties of the character hereinbefore described. The composition may be compounded by dissolving the constituent ingredients in a suitable solvent such, for instance, as toluol, benzene, naphtha, chlorinated hydrocarbons, and similar solvents, and then the dissolved composition may be applied to the desired surface, film or fibrous material.

The following examples in which the parts are by weight describe in detail some of the adhesive compositions which have been prepared in accordance with the hereinbefore described method.

Example I

| | Parts |
|---|---|
| Isobutylene polymer (mol. wt. 95,000) | 10 |
| Isobutylene polymer (mol. wt. 3,000) | 6 |
| Beta pinene polymer resin (M. P. 100° C.) | 6 |
| Dihydro methyl abietate | 4 |
| Monobutyl ether of ethylene glycol stearate | 3 |
| Naphtha (B. P. 110°–275° F.) | 200 |

The above ingredients are placed in a churn and mixed until homogeneous.

In formulating these adhesives, the isobutylene high molecular weight polymer serves as a "rubbery" base for the adhesive, the resin serves to give adhesion and tack, and the working properties are given by the amount of plasticizer and tackifier, such as the methyl abietate. The length of the pull or "legs," as it is known in the adhesive art, can be adjusted by the amount of low molecular weight isobutylene polymer present, although this is not essential to the invention.

The above composition forms a particularly clear and transparent pressure sensitive adhesive composition and is particularly adapted for use in masking tapes, having a transparent film as the support.

The above composition, when coated on a cellulose acetate film to give a masking tape of the transparent type is particularly stable when exposed to sunlight. For instance, the same composition without the fatty ester, when exposed to sunlight transmitted through a window, became hazy and lost its pressure sensitive qualities in four days; the composition with the fatty ester (mono-butyl ether of ethylene glycol stearate) under the same conditions was still in excellent condition at the end of ten days, showing that the fatty ester was in some fashion acting as a stabilizer for the adhesive composition.

While I cannot offer an explanation as to why the fatty esters should act as stabilizers for such adhesive compositions, it is apparent from above example that a superior adhesive composition is obtained by using the fatty acids in the adhesive compositions and a new and unforeseeable result is obtained through the use of such fatty esters.

Example II

| | Parts |
|---|---|
| Isobutylene polymer (mol. wt. 200,000) | 10 |
| Isobutylene polymer (mol. wt. 7,000) | 15 |
| Hydrogenated rosin resin | 2 |
| Methyl abietate | 3 |
| Butyl stearate | 5 |
| Carbon tetrachloride | 100 |
| Naphtha | 60 |

The ingredients were placed in a churn and mixed until homogeneous.

The same sunlight exposure test was made as in Example #I, and again the composition with the butyl stearate was superior in its retention of adhesive qualities as compared to same composition without the fatty ester.

The adhesive compositions described herein, when coated on cellulose film as is done in the cellulose tape field, not only were superior in retaining their original pressure sensitive qualities when exposed to strong sunlight, but were also superior in ordinary shelf aging tests, i. e. making up a finished roll of the masking tape and periodically observing the retention of original pressure sensitive properties with time. Without the fatty ester present, the adhesive composition would have a tendency to become somewhat brittle and dry at end of six weeks, whereas with the fatty acid present, the adhesive composition was still in good condition at the end of five months.

Example III

| | Parts |
|---|---|
| Isobutylene polymer (mol. wt. 60,000) | 15.0 |
| Hydrogenated rosin | 2.5 |
| Dihydro methyl abietate | 2.5 |
| Butyl stearate | 2.0 |
| Naphtha | 150.0 |

The mixing was performed as in the previous examples. The same superior properties as in previous examples were observed.

The presence of the low polymer of isobutylene is not essential to the making of a good pressure sensitive adhesive composition, although it is advantageous where best aging qualities as well as good working qualities are required. Similar softeners and plasticizers as previously mentioned, namely liquid polymers of chlorinated diphenyl, rosin oils, vinyl ethers, and even mineral oil can be used in place of the low polymer of isobutylene. In place of the low polymers of isobutylene there can be used synthetic hydrocarbon oils such as described in U. S. Patent 2,224,349. These synthetic oils are viscous liquids and chemically consist of both normal olefines and iso olefines which have been polymerized as described in this above mentioned patent. The synthetic oils suitable for my use are those having a viscosity of from 50 to 10,000 seconds, as measured at 210° F. by the Universal Saybolt method. The type of pressure sensitive adhesive desired will govern the choice of materials used.

Example IV

Same as Example #I except that a cycloparaffin resin having a melting point of 90 to 108° C. was used in place of the pinene polymer resin.

Example V

Same as Example #I except that mono-ethyl ether of ethylene glycol ricinoleate was used in place of the mono-butyl ether of ethylene glycol stearate.

Where transparency is not required, coloring pigments or pigments such as zinc oxide, titanox, or similar pigments can be used according to desired results. In the case where zinc oxide is used, it will be noticed that a greater amount of tack and adhesiveness is obtained, and such masses are usable for the surgical type of adhesive tapes where the additional zinc oxide gives a greater adhesiveness to the adhesive composition.

Many other formulas can be used depending upon the character of the final composition desired, the base upon which it is applied and the purpose for which it is to be utilized. The proportions of the ingredients can be varied over a wide range, and the essential agents combined either singly, in combination, or compatible mixtures with others of similar characteristics.

In general, I have found that my pressure sensitive adhesive compositions may contain the ingredients previously mentioned, varying in about the range of proportions given below, and still maintain a particularly clear and transparent adhesive coating that is highly stable, which can be used on cellulose film or similar transparent types of film used in the industry. Where transparency is not desired, pigments, fillers, waxes, and similar materials can be used to give a desired result.

RANGE OF PROPORTIONS

| | Percent by weight |
|---|---|
| Rubbery polymer of isobutylene (mol. wt. higher than 30,000) | 10–70 |
| Liquid or semi-liquid polymer of isobutylene (mol. wt. between 1,000 to 7,000) | 0–70 |
| Resin | 5–30 |
| Plasticizer | 2–20 |
| Fatty ester | 2–15 |

It will be apparent from the foregoing description that an excellent stabilizer for an isobutylene polymer adhesive has been provided. Furthermore, it will be obvious to those skilled in the art that various minor modifications may be made in the invention without departing from the spirit of the invention, and accordingly I claim all such modifications which fall fairly within the spirit and scope of the hereinafter appended claims.

What I claim is:

1. A stabilized, pressure sensitive, adhesive composition comprising a high molecular weight polyisobutylene, a thermoplastic adhesion and tack producing resin, a non-volatile plasticizer, and, as a stabilizer, a liquid fatty mono-ester formed by the reaction of a fat acid with a monohydric aliphatic compound selected from the group consisting of the normal primary alcohols and their glycol monoethers.

2. A stabilized, pressure sensitive, adhesive composition comprising a polyisobutylene having a molecular weight above 30,000, a polyisobutylene having a molecular weight between 1000 and 7000, a thermoplastic adhesion and tack producing resin, a non-volatile plasticizer, and, as a stabilizer, a liquid fatty mono-ester formed by the reaction of a fat acid with a monohydric aliphatic compound selected from the group consisting of the normal primary alcohols and their glycol monoethers.

3. A composition of matter as claimed in claim 1, wherein said fatty ester is mono-butyl ether of ethylene glycol stearate.

4. A composition of matter as claimed in claim 1, wherein said fatty ester is mono-methyl ether of ethylene glycol ricinoleate.

5. A composition of matter as claimed in claim 1, wherein said fatty ester is butyl stearate.

6. A stabilized pressure sensitive adhesive composition comprising 10 parts by weight of a polyisobutylene having an average molecular weight of 95,000, 6 parts by weight of a polyisobutylene having an average molecular weight of 3,000, 6 parts by weight of beta pinene polymer resin having a melting point of 100° C., 4 parts by weight of dihydro methyl abietate and, as a stabilizer, 3 parts by weight of mono-butyl ether of ethylene glycol stearate.

7. A stabilized, pressure sensitive, adhesive composition comprising a high molecular weight polyisobutylene, a thermoplastic adhesion and tack producing resin, a non-volatile plasticizer, and as a stabilizer, an ester formed by the reaction of a fat acid with an ethylene glycol monoether of a primary aliphatic alcohol having from 1 to 5 carbon atoms in the alcohol radical.

8. A stabilized, pressure sensitive, adhesive composition comprising a polyisobutylene, a thermoplastic adhesion and tack producing resin, a non-volatile plasticizer, and, as a stabilizer, between 2% and 15% by weight of a liquid fatty mono-ester formed by the reaction of a fat acid with a mono-hydric aliphatic compound selected from the group consisting of the normal primary alcohols and their glycol monoethers.

9. A stabilized, pressure sensitive, adhesive composition comprising between 10% and 70% by weight of a polyisobutylene having an average molecular weight above 30,000, between 0% and 70% by weight of a polyisobutylene having an average molecular weight between 1,000 and 7,000, between 5% and 30% by weight of a thermoplastic adhesion and tack producing resin, between 2% and 20% by weight of a non-volatile plasticizer, and, as a stabilizer, between 2% and 15% by weight of a liquid fatty mono-ester formed by the reaction of a fat acid with a monohydric aliphatic compound selected from the group consisting of the normal primary alcohols and their glycol monoethers.

10. A method of stabilizing pressure sensitive adhesive compositions, containing a high molecular polyisobutylene, a thermoplastic adhesion and tack producing resin, and a non-volatile plasticizer, which method comprises adding to and intimately mixing with said compositions a stabilizer in the form of a liquid fatty mono-ester formed by the reaction of a fat acid with a monohydric aliphatic compound selected from the group consisting of the normal primary alcohols and their glycol monethers, said stabilizer being added in a proportion to constitute between 2% and 15% by weight of the stabilized composition.

GERRY MACK.